(12) United States Patent
Dams et al.

(10) Patent No.: US 7,998,585 B2
(45) Date of Patent: Aug. 16, 2011

(54) COMPOSITIONS FOR AQUEOUS DELIVERY OF FLUORINATED OLIGOMERIC SILANES

(75) Inventors: Rudolf J. Dams, Antwerp (BE); Mark J. Pellerite, Woodbury, MN (US); Steven J. Martin, Shoreview, MN (US); Michael S. Terrazas, Prescott, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 12/784,892

(22) Filed: May 21, 2010

(65) Prior Publication Data

US 2010/0233492 A1    Sep. 16, 2010

Related U.S. Application Data

(60) Continuation of application No. 11/951,359, filed on Dec. 6, 2007, now abandoned, which is a division of application No. 10/745,003, filed on Dec. 23, 2003, now Pat. No. 7,321,018.

(51) Int. Cl.
*B32B 17/00* (2006.01)

(52) U.S. Cl. .......... 428/429; 526/279; 524/588; 528/32

(58) Field of Classification Search ................ 526/279; 528/32; 428/429; 524/588
See application file for complete search history.

(56) References Cited

U.S. PATENT DOCUMENTS

| | | | |
|---|---|---|---|
| 2,803,615 A | 8/1957 | Ahlbrecht | |
| 3,012,006 A | 12/1961 | Holbrook et al. | |
| 3,772,195 A | 11/1973 | Francen | |
| 3,787,351 A | 1/1974 | Olson | |
| 4,085,137 A | 4/1978 | Mitsch et al. | |
| 4,090,967 A | 5/1978 | Falk | |
| 4,099,574 A | 7/1978 | Cooper et al. | |
| 4,242,516 A | 12/1980 | Mueller | |
| 4,359,096 A | 11/1982 | Berger | |
| 4,383,929 A | 5/1983 | Bertocchio et al. | |
| 4,472,286 A | 9/1984 | Falk | |
| 4,536,298 A | 8/1985 | Kamei et al. | |
| 4,668,406 A | 5/1987 | Chang | |
| 4,795,764 A | 1/1989 | Alm et al. | |
| 4,983,769 A | 1/1991 | Bertocchio et al. | |
| 5,085,786 A | 2/1992 | Alm et al. | |
| 5,274,159 A | 12/1993 | Pellerite et al. | |
| 5,527,931 A | 6/1996 | Rich et al. | |
| 5,550,184 A | 8/1996 | Halling | |
| 5,702,509 A | 12/1997 | Pellerite et al. | |
| 5,739,369 A | 4/1998 | Matsumura et al. | |
| 5,851,674 A | 12/1998 | Pellerite et al. | |
| 6,156,860 A | 12/2000 | Tanaka et al. | |
| 6,204,350 B1 | 3/2001 | Liu et al. | |
| 6,592,659 B1 * | 7/2003 | Terrazas et al. | 106/287.13 |
| 6,689,854 B2 | 2/2004 | Fan et al. | |
| 6,861,149 B2 | 3/2005 | Pellerite et al. | |
| 6,977,307 B2 * | 12/2005 | Dams | 556/485 |
| 7,166,329 B2 | 1/2007 | Dams | |
| 7,321,018 B2 | 1/2008 | Dams et al. | |
| 7,470,741 B2 | 12/2008 | Dams | |

FOREIGN PATENT DOCUMENTS

| | | |
|---|---|---|
| EP | 0 222 157 | 5/1987 |
| EP | 0 248 383 | 12/1987 |
| EP | 0 426 530 | 5/1991 |
| EP | 0 526 976 | 2/1993 |
| EP | 1 225 187 * | 7/2002 |
| EP | 1 225 188 * | 7/2002 |
| JP | 62-063560 | 3/1987 |
| WO | WO 01/30873 | 5/2001 |
| WO | WO 03/044075 | 5/2003 |
| WO | WO 03/046056 | 6/2003 |

OTHER PUBLICATIONS

Kissa, "Structure of Fluorinated Surfactants," *Fluorinated Surfactants and Repellent; Surfactant Science Series*, 2nd Ed., Marcel Dekker, Inc., vol. 97, pp. 1-28, (2001).
Rosen, Characteristic Features of Surfactants, "*Surfactants and Interfacial Phenomena*," 2nd Ed., Wiley & Sons, New York, NY, pp. 1-5, (1989).
PCT International Search Report and Written Opinion dated Mar. 21, 2005, PCT/US2004/038258.

* cited by examiner

*Primary Examiner* — Kuo-Liang Peng
(74) *Attorney, Agent, or Firm* — Kathleen B. Gross

(57) ABSTRACT

The invention relates to a dilutable, non-aqueous concentrate and an aqueous dilution used for aqueous delivery of fluorinated oligomeric silanes to a substrate, a method of treating a substrate with the aqueous dilution composition to render it oil and water repellent, and articles having coatings made from the aqueous dilution.

20 Claims, No Drawings

COMPOSITIONS FOR AQUEOUS DELIVERY OF FLUORINATED OLIGOMERIC SILANES

CROSS REFERENCE TO RELATED APPLICATIONS

This application is a continuation of U.S. application Ser. No. 11/951,359, filed Dec. 6, 2007, now abandoned, which was a divisional of U.S. application Ser. No. 10/745,003, filed Dec. 23, 2003, issued as U.S. Pat. No. 7,321,018, the disclosures of which are incorporated by reference in their entirety herein.

FIELD OF THE INVENTION

This invention relates to aqueous delivery of fluorinated oligomeric silanes to a substrate. More particularly, the present invention is a dilutable, non-aqueous concentrate comprising at least one fluorinated oligomeric silane and at least one surfactant, which together with water or an aqueous solvent mixture form an aqueous dilution that may be coated and cured on a substrate.

BACKGROUND OF THE INVENTION

Good oil-repellent and water-repellent coatings may be provided to certain substrates by applying to a substrate fluorinated silanes in the molten state or dissolved in volatile organic solvents. The applied fluorinated silanes are cured by heating with a catalyst to chemically affix the fluorinated silanes to the substrates. (See, for example, U.S. Pat. No. 3,012,006 (Holbrook et al.)). However, the use of volatile organic solvents is generally harmful to the environment, and may be hazardous due to the flammability of the solvents. Therefore, an alternative means to apply fluorinated silanes to substrates was developed, which is to use aqueous delivery. (See, for example, U.S. Pat. No. 5,274,159 (Pellerite et al.), U.S. Pat. No. 5,702,509 (Pellerite et al.), and U.S. Pat. No. 5,550,184 (Halling)).

One problem with known compositions for the aqueous delivery of fluorinated silanes to substrates is that they may not have long shelf lives. Another problem is that they may require high-shear mixing before they are coated on a substrate. Known compositions have high solids content, which result in thick coatings.

Although using aqueous delivery of fluorinated silanes to substrates is known in the art, there continues to be a desire to provide compositions for aqueous delivery of fluorinated silanes that: 1) can be stored for relatively long periods of time; 2) do not require high-shear mixing or other input of mechanical energy; 3) have relatively low solids content, making them easier to coat thinly on glass and other substrates; and 4) at the same time, once applied to a substrate and cured, can provide durable coatings. Such compositions have been recently described using fluorinated silanes and a fluorinated surfactant. See, for example, WO 03/044075 and WO 03/046056. Coating compositions containing fluorochemical oligomeric silanes have been described in U.S. Pat. No. 5,739,369, U.S. Pat. No. 5,527,931, EP 222,157, EP 225,187 and EP 225,188.

SUMMARY OF THE INVENTION

The present invention provides compositions for the aqueous delivery of fluorinated oligomeric silanes. One embodiment is a dilutable, non-aqueous concentrate and another embodiment is an aqueous dilution using the dilutable, non-aqueous concentrate and a diluting medium that contains water or an aqueous solvent mixture. The compositions can be stored for long periods of time and are easy to prepare by simple mixing without the need for high shear emulsification. The coatings from the composition provide oil and water repellency and easy-to-clean properties for hard or soft substrates.

The present invention provides a dilutable, non-aqueous concentrate containing a non-aqueous, homogeneous mixture including: (a) at least one fluorinated oligomeric silane of the formula I:

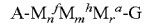

$$A\text{-}M_n^f M_m^h M_r^a\text{-}G$$

wherein: A is hydrogen or a residue of an initiating species; $M^f$ represents units derived from one or more fluorinated monomers; $M^h$ represents units derived from one or more non-fluorinated monomers; $M^a$ represents units derived from one or more non-fluorinated monomers having a silyl group; $SiY_3$ where Y is a hydrolyzable group; G is a residue of a chain transfer agent of the formula:

$$\text{—S-Q-Y}_3$$

in which Y is a hydrolyzable group and Q is an organic divalent linking group; n is an integer from 1 to 100; m is an integer from 0 to 100; and r is an integer from 0 to 100; and (b) at least one surfactant.

The dilutable, non-aqueous concentrate must be diluted with water or an aqueous solvent mixture before being coated on a substrate. Advantageously, the dilutable, non-aqueous concentrate has a relatively long shelf life that is greater than about 1 day, preferably greater than about 14 days, and most preferably greater than about 6 months under proper storage conditions. The dilutable, non-aqueous concentrate may be shipped and stored more economically than in diluted form. The dilutable, non-aqueous concentrate may be diluted at the location where it is to be coated, which advantageously allows for greater flexibility in choices of the dilution and hence thickness of the coatings being applied. The dilutable, non-aqueous concentrate is dispersed in water or an aqueous solvent mixture (to form the aqueous dilution) simply by shaking by hand a mixture of the dilutable, non-aqueous concentrate and either water or an aqueous solvent mixture. No additional mechanical processing, such as high-shear mixing or ultrasonication, is required.

In another aspect, the present invention provides an aqueous dilute composition containing: (a) a diluting medium including water or an aqueous solvent mixture including water and at least one water miscible cosolvent; and (b) a dilutable, non-aqueous concentrate containing a non-aqueous, homogeneous mixture including: (i) at least one fluorinated oligomeric silane as defined above; and (ii) at least one surfactant.

The aqueous dilute composition may be coated on a substrate to provide a durable coating. Advantageously, the aqueous dilute composition of the present invention has a relatively low solids content, which makes it easier to coat thinly on glass or other siliceous substrates that may have, for example, optical properties that are sensitive to thickness. The inventive aqueous dilution allows for the elimination of or the substantial reduction in the use of organic solvents in the process that may be flammable and/or harmful to the environment. The aqueous dilute composition also has a shelf life that is at least several hours under proper storage conditions.

Other embodiments of the present invention include a method of treating a substrate, and an article including a substrate and a coating that is formed by coating and curing the aqueous dilute composition.

DETAILED DESCRIPTION OF ILLUSTRATIVE EMBODIMENTS OF THE INVENTION

Dilutable, Non-Aqueous Concentrate

The dilutable, non-aqueous concentrate of the present invention contains a non-aqueous, homogeneous mixture that includes at least one fluorinated oligomeric silane and at least one surfactant. The dilutable, non-aqueous concentrate may optionally further include at least one organic cosolvent, and/or at least one additive.

A "homogeneous mixture," when referring to the dilutable, non-aqueous concentrate, is defined as the dilutable, non-aqueous concentrate being stable, i.e., no substantial precipitation or substantial phase separation occurs for at least the time necessary to prepare an aqueous dilution from the dilutable, non-aqueous concentrate, however, preferably, and for the purpose of being commercially practical, the dilutable concentrate is stable for a period of at least about one day, and preferably up to about six months or longer, under proper storage conditions (closed container, no water, room temperature). The dilutable, non-aqueous concentrate may be clear or somewhat hazy.

By the term "non-aqueous" it is meant that water is not added as a component of the dilutable, non-aqueous concentrate. However, there may be adventitious water in the other components of the composition, but the total amount of water does not adversely affect the shelf life or the stability of the dilutable, non-aqueous concentrate (i.e., preferably less than about 0.1 wt % of the dilutable, non-aqueous concentrate).

Fluorinated Oligomeric Silane

The fluorinated oligomeric silane of the dilutable, non-aqueous concentrate has the formula

$$A-M^f_n M^h_m M^a_r-G \quad (I)$$

wherein A represents hydrogen or the residue of an initiating species, e.g., an organic compound having a radical and that derives from the decomposition of a free radical initiator or that derives from a chain transfer agent;

$M^f$ represents units derived from one or more fluorinated monomers as described above;

$M^h$ represents units derived from one or more non-fluorinated monomers;

$M^a$ represents units having a silyl group represented by the formula: $SiY_3$ wherein Y independently represents an alkyl group, an aryl group or a hydrolyzable group as defined below; and G is a monovalent organic group comprising the residue of a chain transfer agent, and having the formula: $—S-Q-Y_3$;

wherein Q is an organic divalent linking group as defined below, and

Y independently represents a hydrolyzable group.

The total number of units represented by the sum of n, m and r is generally at least 2 and preferably at least 3 so as to render the compound oligomeric. The value of n in the fluorochemical oligomer is between 1 and 100 and preferably between 1 and 20. The values of m and r are between 0 and 100 and preferably between 0 and 20. According to a preferred embodiment, the value of m is less than that of n and n+m+r is at least 2.

The fluorochemical oligomers typically have an average molecular weight between 400 and 100000, preferably between 600 and 20000, more preferably between 1000 and 10000. The fluorochemical oligomer preferably contains at least 5 mole % (based on total moles of units $M^f$, $M^h$ and $M^a$) of hydrolysable groups.

It will further be appreciated by one skilled in the art that the preparation of fluorochemical oligomers useful in the present invention results in a mixture of compounds and accordingly, general formula I should be understood as representing a mixture of compounds whereby the indices n, m and r in formula I represent the molar amounts of the corresponding unit in such mixture. Accordingly, it will be clear that n, m and r can be fractional values.

The units $M^f_n$, of the fluorochemical oligomer are derived from fluorinated monomers, preferably fluorochemical acrylates and methacrylates.

Examples of fluorinated monomers for the preparation of the fluorochemical oligomer include those that can be represented by general formula:

$$R_f-Q-E \quad (II)$$

wherein $R_f$ represents a partially or fully fluorinated aliphatic group having at least 3 carbon atoms, Q represents an organic divalent linking group and E represents an ethylenically unsaturated group. The ethylenically unsaturated group E can be fluorinated or non-fluorinated.

The fluoroaliphatic group $R_f$ in the fluorochemical monomer can be a fluorinated, stable, inert, preferably saturated, non-polar, monovalent aliphatic radical. It can be straight chain, branched chain, or cyclic or combinations thereof. It can contain heteroatoms such as oxygen, divalent or hexavalent sulfur, or nitrogen. $R_f$ is preferably a fully-fluorinated radical. The $R_f$ radical has at least 2 and up to 18 carbon atoms, preferably 3 to 14, more preferably 2 to 8, especially 4. The terminal portion of the $R_f$ radical is a perfluorinated moiety, which will preferably contain at least 5 fluorine atoms, e.g., $CF_3CF_2—$, $CF_3CF_2CF_2—$, and $(CF_3)_2CF—$. The preferred $R_f$ radicals are fully or substantially fluorinated and are preferably those perfluorinated aliphatic radicals of the formula $C_nF_{2n+1}—$ where n is 2 to 6, particularly 3 to 5. Compounds wherein the $R_f$ radical is a $C_4F_9—$ are generally more environmentally friendly than compounds where the $R_f$ radical consists of a perfluorinated group with more carbon atoms. Surprisingly, despite the short $C_4$ perfluorinated group, the fluorochemical oligomeric compounds prepared therewith are highly effective.

The linking group Q in the above formula (II) links the fluoroaliphatic or the fluorinated polyether group $R_f$ to the free radical polymerizable group E, and is a generally non-fluorinated organic linking groups. The linking group can be a chemical bond, but preferably contains from 1 to about 20 carbon atoms and may optionally contain oxygen, nitrogen, or sulfur-containing groups or a combination thereof. The linking group is preferably free of functional groups that substantially interfere with free-radical oligomerization (e.g., polymerizable olefinic double bonds, thiols, and other such functionality known to those skilled in the art). Examples of suitable organic divalent linking groups include:

$*—COQ'-R^1-Q''-CO—$, $*—COO—CH_2—CH(OH)—R^1-Q'-CO—$, $*-L^1-Q'-CONH-L^2-$, $*—R^1-Q'-CO—*—COQ'-R^1—$, $—R^1—$, $COQ'-R^1-Q'-$, $*—SO_2NR^a—R^1-Q'-$, $*—SO_2NR^a—R^1—$, and $*—SO_2NR^a—R^1-Q'-CO—$, wherein Q' and Q" represent O or $NR^a$, $R^a$ is hydrogen or an alkyl group of 1 to 4 carbon atoms, R' represents a linear, cyclic or branched alkylene group that may be interrupted by one or more heteroatoms such as O or N, $L^1$ and $L^2$ represent each independently represent a non-fluorinated organic divalent linking group including for example an alkylene group, a carbonyl group, a carbonamido alkylene group and/or carboxy alkylene group, and * indicates the position where the linking group is attached to the group $R_f$ in formula (II). Preferred linking groups include —SO$_2$N(R$_1$)—OC(O)—, and —(CH$_2$)$_d$—OC(O)—, where R$_1$ is hydrogen or a C$_1$-C$_4$ alkyl group and d is an integer from 1 to 20.

Fluorochemical monomers $R_f$-Q-E as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976.

Perfluoropolyether acrylates or methacrylates are described in U.S. Pat. No. 4,085,137.

Preferred examples of fluorochemical monomers include:
CF$_3$(CF$_2$)$_2$CH$_2$OC(O)CH=CH$_2$,
CF$_3$(CF$_2$)$_2$CH$_2$OC(O)C(CH$_3$)=CH$_2$,
CF$_3$(CF$_2$)$_3$CH$_2$OCOC(CH$_3$)=CH$_2$,
CF$_3$(CF$_2$)$_3$CH$_2$OCOCH=CH$_2$,

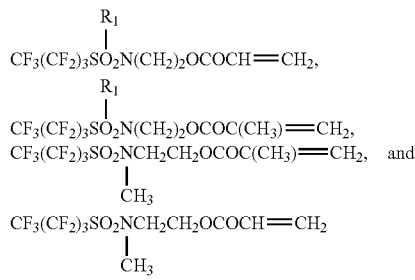

wherein R$_1$ represents methyl, ethyl or n-butyl.

The units M$^h$ of the fluorochemical oligomer (when present) are generally derived from a non-fluorinated monomer, preferably a monomer consisting of a polymerizable group and a hydrocarbon moiety. Hydrocarbon group containing monomers are well known and generally commercially available. Examples of hydrocarbon containing monomers include those according to formula:

$$R^h\text{-Q-E} \qquad (III)$$

wherein R$^h$ represents a hydrocarbon group, Q represents a chemical bond or a divalent linking group as defined above and E is an ethylenically unsaturated group as defined above. The hydrocarbon group is preferably selected from the group consisting of a linear, branched or cyclic alkyl group, an aralkyl group, an alkylaryl group and an aryl group. Preferred hydrocarbon groups contain from 4 to 30 carbon atoms. Further non-fluorinated monomers include those wherein the hydrocarbon group in formula (III) includes oxyalkylene groups or contains one or more reactive groups, such as hydroxy groups, amino groups, epoxy groups, halogens such as chlorine and bromine.

Examples of non-fluorinated monomers from which the units M$^h$ can be derived include general classes of ethylenic compounds capable of free-radical polymerization, such as, for example, allyl esters such as allyl acetate and allyl heptanoate; alkyl vinyl ethers or alkyl allyl ethers, such as cetyl vinyl ether, dodecylvinyl ether, 2-chloroethylvinyl ether, ethylvinyl ether; anhydrides and esters of unsaturated acids such as acrylic acid, methacrylic acid, alpha-chloro acrylic acid, crotonic acid, maleic acid, fumaric acid or itaconic acid, for example vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride. Preferred non-fluorinated monomers include hydrocarbon group containing monomers such as those selected from octadecylmethacrylate, laurylmethacrylate, butylacrylate, N-methylol acrylamide, isobutylmethacrylate, ethylhexyl acrylate and ethylhexyl methacrylate; and vinylchloride and vinylidene chloride.

The fluorochemical oligomer useful in the invention generally further includes units M$^a$ that have a silyl group and hydrolyzable groups at the terminus of the units derived from one or more non-fluorinated monomers as defined above. Examples of units M$^a$ include those that correspond to the general formula:

$$R^H\text{-Q-E-G-SiY}_3 \qquad (IV)$$

Typical examples of such monomers include vinyltrichlorosilane, vinyltrimethoxysilane, vinyltriethoxysilane, trimethoxysilylpropylmethacrylate and the like.

The fluorochemical oligomer is conveniently prepared through a free radical polymerization of a fluorinated monomer with optionally a non-fluorinated monomer and a monomer containing the silyl group in the presence of a chain transfer agent. A free radical initiator is generally used to initiate the polymerization or oligomerization reaction. Commonly known free-radical initiators can be used and examples thereof include azo compounds, such as azobisisobutyronitrile (ABIN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The oligomerization reaction can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methylethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON™113, trichloroethylene, α,α,α-trifluorotoluene, and the like, and mixtures thereof.

The oligomerization reaction can be carried out at any temperature suitable for conducting an organic free-radical reaction. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are between about 30° C. and about 200° C., preferably between 50 and 100° C.

The fluorochemical oligomer is typically prepared in the presence of a chain transfer agent. Suitable chain transfer agents may include a hydroxy-, amino-, mercapto or halogen group. The chain transfer agent may include two or more of such hydroxy, amino-, mercapto or halogen groups. Typical chain transfer agents useful in the preparation of the fluorochemical oligomer include those selected from 2-mercaptoethanol, 3-mercapto-2-butanol, 3-mercapto-2-propanol, 3-mercapto-1-propanol, 3-mercapto-1,2-propanediol, 2-mercapto-ethylamine, di(2-mercaptoethyl)sulfide, octylmercaptane, and dodecylmercaptane.

In a preferred embodiment a chain transfer agent containing a silyl group having hydrolyzable groups is used in the oligomerization to produce the fluorochemical oligomer. Chain transfer agents including such a silyl group include those groups according to formula V:

HS-Q-SiY$_3$ (V)

wherein Q represents an organic divalent linking group such as for example a straight chain, branched chain or cyclic alkylene, arylene or aralkylene. Preferred is an alkylene group from 1 to 20 carbon atoms, and Y is independently a hydrolyzable group as defined above.

A single chain transfer agent or a mixture of different chain transfer agents may be used. The preferred chain transfer agents are 2-mercaptoethanol, octylmercaptane and 3-mercaptopropyltrimethoxysilane. A chain transfer agent is typically present in an amount sufficient to control the number of polymerized monomer units in the oligomer and to obtain the desired molecular weight of the oligomeric fluorochemical silane. The chain transfer agent is generally used in an amount of about 0.05 to about 0.5 equivalents, preferably about 0.25 equivalents, per equivalent of monomer including fluorinated and non-fluorinated monomers.

The fluorochemical oligomer useful in the present invention contains hydrolyzable groups. These hydrolysable groups may be introduced in the fluorochemical oligomer by oligomerizing in the presence of a chain transfer agent having a silyl group containing hydrolyzable groups, for example a chain transfer agent according to formula V above wherein Y represents a hydrolyzable group. Alternatively, a functionalized chain transfer agent or functionalized comonomer can be used which can be reacted with a silyl group containing reagent subsequent to the oligomerization.

Thus, according to a first embodiment a fluorochemical oligomer is prepared by oligomerizing a fluorinated monomer and optional non-fluorinated monomer with a monomer according to formula IV above wherein Y represents a hydrolysable group in the presence of a chain transfer agent which may optionally also contain a silyl group such as for example a chain transfer agent according to formula V above wherein Y represents a hydrolysable group.

As a variation to the above method the oligomerization may be carried out without the use of the silyl group containing monomer but with a chain transfer agent containing the silyl group.

Surfactant

A surfactant is defined as "a substance that, when present at low concentration in a system, has the property of adsorbing onto the surfaces or interfaces of the system and of altering to a marked degree the surface or interfacial free energies of these surfaces." (Milton J. Rosen, "Surfactants and Interfacial Phenomena," Second Ed., John Wiley & Sons, New York, N.Y., 1989, page 1). These surfactants have "a characteristic molecular structure consisting of a structural group that has very little attraction for a solvent, known as a lyophobic group, together with a group that has a strong attraction for a solvent, called the lyophilic group . . . ." (Milton J. Rosen, "Surfactants and Interfacial Phenomena," Second Ed., John Wiley & Sons, New York, N.Y., 1989, pages 3-4). When the solvent is aqueous, the lyophobic group is typically a nonpolar group such as alkyl or fluorinated alkyl, while the lyophilic group is a polar group.

The term "fluorinated" (as in the term fluorinated surfactant) indicates that at least about 75 percent, preferably at least about 85 percent, more preferably at least about 95 percent, of the hydrogen atoms of the alkyl moiety are replaced by fluorine atoms. Optionally, remaining hydrogen atoms can be replaced by other halogen atoms, such as by chlorine atoms.

The fluorinated surfactant acts to stabilize an emulsion (that is, droplets of one liquid phase dispersed in another liquid phase), and can aid in solubility or compatibility of the fluorinated silane(s) and the organic cosolvent(s) (if there is one or more organic cosolvent(s)) of the dilutable, non-aqueous concentrate.

Fluorinated surfactants useful in this invention are amphiphilic materials, comprising one or more hydrophobic fluorochemical segments and one or more solubilizing and hydrophilic segments. Such materials are described in "Fluorinated Surfactants and Repellents", Second Edition, by E. Kissa, Surfactant Science Series, Volume 97, Marcel Dekker, Inc.: New York, 2001, pp 1-21. The fluorinated surfactants have a fluorine content by weight of at least 10%. These fluorinated surfactants can be monomeric or polymeric, with molecular weights between about 300 and about 100,000 grams per mole, preferably between about 400 and about 20,000 grams per mole. The hydrophobic fluorochemical groups can be, for instance, perfluoroalkyl containing between about 3 and about 20 carbon atoms, or a mono- or divalent perfluoropolyether group with molecular weight between about 300 and about 10,000 grams per mole. Hydrophilic groups on the fluorinated surfactants can be of anionic (such as carboxylate), cationic (such as quaternary ammonium), nonionic (such as oligo(oxyethylene)) or amphoteric (such as amine oxide) nature as long as they do not contain functionalities that cause instability in the concentrates of this invention, for example strongly acidic groups, strongly basic groups, or contamination by fluoride ions.

Representative fluorinated surfactants include, but are not limited to, the following:

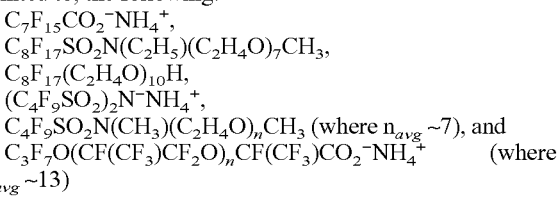

$C_7F_{15}CO_2^-NH_4^+$,
$C_8F_{17}SO_2N(C_2H_5)(C_2H_4O)_7CH_3$,
$C_8F_{17}(C_2H_4O)_{10}H$,
$(C_4F_9SO_2)_2N^-NH_4^+$,
$C_4F_9SO_2N(CH_3)(C_2H_4O)_nCH_3$ (where $n_{avg}$ ~7), and
$C_3F_7O(CF(CF_3)CF_2O)_nCF(CF_3)CO_2^-NH_4^+$ (where $n_{avg}$ ~13)

Examples of these and other fluorinated surfactants of the present invention are described, for example, in U.S. Pat. Nos. 3,772,195 (Francen), 4,090,967 (Falk), 4,099,574 (Cooper et al.), 4,242,516 (Mueller), 4,359,096 (Berger), 4,383,929 (Bertocchio et al.), 4,472,286 (Falk), 4,536,298 (Kamei et al.), 4,795,764 (Alm et al.), 4,983,769 (Bertocchio et al.) and 5,085,786 (Alm et al.), which are herein incorporated by reference. Many of these fluorinated surfactants are commercially available from Minnesota Mining and Manufacturing Company (St. Paul, Minn.), having the tradename FLUO- RAD™, or commercially available from E.I. DuPont de Nemours and Co. (Wilmington, Del.), having the tradename ZONYL™.

Polymeric fluorinated surfactants can also be used in the present invention. Examples of polymeric fluorinated surfactants that may be used in the present invention are found in U.S. Pat. No. 3,787,351 (Olson), U.S. Pat. No. 4,668,406 (Chang), and PCT International App. WO 01/30873, which are incorporated herein by reference.

Examples of polymeric fluorinated surfactants that may be used include random copolymer fluorinated surfactants. Examples of random copolymer fluorinated surfactants include the following structures:

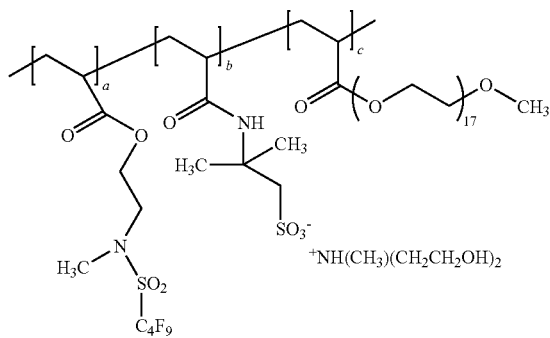

wherein the molar ratio of a:b:c is about 30:about 1:about 32, and wherein the molecular weight of the surfactant is about 1,000 to about 4,000 grams per mole; and

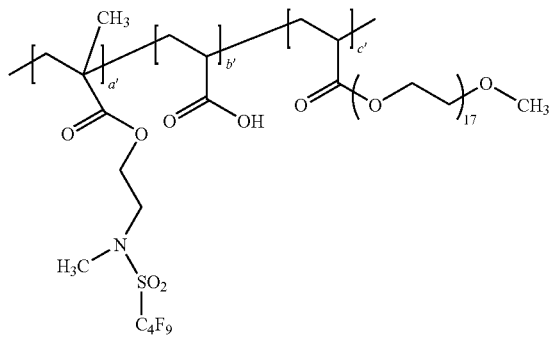

wherein the molar ratio of a':b':c' is about 3:about 3:about 1, and wherein the molecular weight of the surfactant is about 1,000 to about 40,000 grams per mole.

The surfactant may also be a hydrocarbon or silicone surfactant. The hydrocarbon or silicone surfactant may be a cosurfactant with a fluorinated surfactant above defined. Typically a hydrocarbon surfactant includes nonionic surfactants, for example, alkylenediolpolyethylene glycols, alkylphenol-polyethylene glycols or mixtures thereof, such as Triton™ X-305, Surfynol™ 465 or Tween™ 80; cationic surfactants such as Arquad™ 2C-75; anionic surfactants such as Witcolate™ 4085, amphoteric surfactants such as dicocomethyl-ammonium chloride. Typically a silicone surfactant includes, for example, alkyleneoxy containing silicone oligomers, such as Silwet™ L-77 and Sylgard™ 309.

The surfactant is generally included in the dilutable, non-aqueous concentrate in an amount up to about 50 wt % of the dilutable, non-aqueous concentrate, preferably up to about 30 wt %, and most preferably up to about 15 wt %.

Optional Organic Cosolvent

A dilutable, non-aqueous concentrate of the present invention may also optionally include one or more organic cosolvents. An organic cosolvent is an organic liquid component that renders the surfactant(s) and the fluorinated silane(s) compatible (in case they are not compatible in the absence of the organic cosolvent), and lowers the viscosity of the dilutable, non-aqueous concentrate.

Suitable organic cosolvents are organic solvents, or mixtures of organic solvents, that include, but are not limited to, aliphatic alcohols, such as methanol, ethanol, and isopropyl alcohol; ketones, such as acetone or methyl ethyl ketone; esters, such as ethyl acetate or methyl formate; ethers, such as diisopropyl ether, 1,4-dioxane, and diethylene glycol dimethyl ether; and amides, such as N-methylpyrrolidinone, and N,N-dimethylformamide. Fluorinated organic solvents, such as heptafluorobutanol, trifluoroethanol and hexafluoroisopropanol, or hydrofluoroethers, such as FIFE-7100 (available from 3M Company) may be used alone or in combination with non-fluorinated organic cosolvents.

Preferred organic cosolvents are aliphatic alcohols. Some examples of preferred aliphatic alcohols are ethanol, and isopropyl alcohol. Other examples include alkyleneoxide containing alcohols, such as DOWANOL™ DPnP (available from Sigma-Aldrich, Milwaukee, Wis.), and DOWANOL™ DPM (available from Sigma-Aldrich), etc.

Preferably, the organic cosolvent is water miscible. Also, preferably, the organic cosolvent has a boiling point that is below 200° C.

The organic cosolvent may generally be included, if used, in the dilutable, non-aqueous concentrate in an amount up to about 75 wt % of the dilutable, non-aqueous concentrate, and preferably up to about 50 wt %.

Optional Additives

The dilutable, non-aqueous concentrate may also include one or more optional additives.

Some examples of optional additives are catalysts to assist with curing and/or crosslinking of the dilutable, non-aqueous concentrate once it is diluted and coated on a substrate. A curing additive may be added when necessary to facilitate the cure. Such a curing additive may take the form of an acid precursor, which releases an acid upon exposure to heat, ultraviolet light, visible light, electron beam irradiation, or microwave irradiation. Acid precursors include, for instance, sulfonium and iodonium salts as well as alkyl esters of alkane- or fluoroalkanesulfonic acids, and are described in U.S. Pat. No. 6,204,350 (Liu et al.) incorporated by reference.

Some additives, such as ammonium salts of acids such as perfluorocarboxylic acids, alkylsulfonic acids, arylsulfonic acids, perfluoroalkylsulfonic acids, and perfluoroalkylsulfonimides can function as latent or thermally activated curing additives as well as function as surfactants. Therefore, the dilutable, non-aqueous concentrate may include one of these dual-functioning surfactants, and may not need a separate catalyst.

Other possible optional additives include, but are not limited to, antimicrobial agents, UV absorbers, hydrocarbon silanes, alkoxysilanes, titanates, zirconates, and micro- or nanoparticles of inorganic materials, such as silica or titania.

An optional additive or additives may be included in the dilutable, non-aqueous concentrate in an amount up to about 50% by weight of the dilutable, non-aqueous concentrate, more preferably up to about 5% by weight.

The dilutable, non-aqueous concentrate may be prepared by combining the components in any order and in a fashion that is known in the art. Preferably, for the embodiment comprising at least one fluorinated oligomeric silane, at least one surfactant and at least one organic cosolvent, the surfactant(s) and organic cosolvent(s) are first mixed and then the fluorinated oligomeric silane(s) is added to the mixture.

If the dilutable, non-aqueous concentrate is not immediately homogeneous after mixing the ingredients, the concentrate may become homogeneous after time has passed. In order to speed homogeneity, however, the dilutable, non-aqueous concentrate may be heated.

For ease of manufacture, etc., the dilutable, non-aqueous concentrate is typically diluted with a diluting medium (or the aqueous dilution composition is typically prepared) shortly before use.

The presence of certain chemical functionalities such as strong acids (i.e., sulfonic, mineral, phosphoric, and perfluorinated acids) and species such as fluoride ion are preferably avoided in the dilutable, non-aqueous concentrate of this invention if they lead to instability of the corresponding aqueous dilution and/or the dilutable, non-aqueous concentrate itself.

Aqueous Dilution

Another embodiment of the present invention is an aqueous dilution, which comprises: the dilutable, non-aqueous concentrate, described above; and, a diluting medium that comprises water or an aqueous solvent mixture comprising water and a water miscible cosolvent. The aqueous dilution may also include optional additives.

Diluting Medium

The diluting medium of the aqueous dilution comprises water or an aqueous solvent mixture. The aqueous solvent mixture comprises water and a water miscible cosolvent.

Examples of water miscible cosolvents include, but are not limited to an alcohol, e.g., ethanol, isopropyl alcohol, DOWANOL™ DPM; a ketone, e.g., acetone; an ether, e.g., diethylene glycol dimethyl ether; and others, such as N-methylpyrrolidinone.

The amount of water miscible cosolvent that is included in the aqueous dilution (if an aqueous solvent mixture is used) is dependent upon the coating technique that is to be used to coat the aqueous dilution, as well as dependent upon the performance characteristics that are desired in the resultant coated substrate.

Optional Additives

The aqueous dilution may also optionally comprise at least one additive. Some exemplary additives are described above. The optional additive(s) of the aqueous dilution may be in addition to the additive(s) in the dilutable, non-aqueous concentrate. As discussed above with regard to the dilutable, non-aqueous concentrates, additives which adversely affect the stability of the aqueous dilution are preferably avoided. These additives may include strongly acidic species and fluoride ions. The pH of the aqueous dilution is in the range of about 2 to about 11, and most preferably about 4 to about 8.

The aqueous dilution may be prepared by first combining the components of the dilutable, non-aqueous concentrate and then subsequently adding the dilutable, non-aqueous concentrate to the diluting medium. The aqueous dilution is preferably prepared, however, by adding the diluting medium to the dilutable, non-aqueous concentrate.

The amount of dilutable, non-aqueous concentrate that is typically in the aqueous dilution is from about 0.05 wt % to about 10 wt % of the aqueous dilution, preferably from about 0.1 wt % to about 5 wt %. The aqueous dilution may be a clear solution as well as a somewhat hazy solution.

An optional additive or additives may be added to the aqueous dilution after the dilutable, non-aqueous concentrate has been diluted. One preferred optional additive is a curing additive, such as those discussed above, that may be added to the aqueous dilution in an amount up to about 3 wt % of the aqueous dilution.

The aqueous dilution is generally applied to a substrate (substrate described in detail below with regard to the method) in an amount sufficient to produce a coating that is water and oil repellent. This coating can be extremely thin, e.g., about 10 to about 20 nanometers in thickness, though in practice a coating may be thicker, e.g., up to about 50 to 100 nanometers in thickness.

The aqueous dilution of the present invention advantageously spreads well on a substrate to achieve uniform properties over the whole surface of the treated substrate. In addition, the aqueous dilutions minimize or eliminate the use of volatile organic compounds (VOCs), thereby reducing pollution and exposure to potentially harmful, and often flammable, solvent vapors.

Method

The present invention also provides a method for treating a substrate, comprising the steps of applying the aqueous dilution of the invention, as discussed above, to a substrate and curing the aqueous dilution to form a treated substrate.

Suitable substrates that can be treated with the aqueous dilution of this invention include, but are not limited to, substrates having a hard surface preferably with functional groups, such as —OH groups that occur on siliceous or metal substrates, capable of reacting with the silane. Preferably, such reactivity of the surface of the substrate is provided by functional groups having active hydrogen atoms, such as —OH. When such active hydrogen atoms are not present, the substrate may first be treated in a plasma containing oxygen or in a corona atmosphere to make it reactive to the fluorinated silane.

Treatment of substrates renders the treated surfaces less retentive for soils and more readily cleanable due to the oil and water repellent nature of the treated surfaces. These desirable properties are maintained despite extended exposure or use and repeated cleanings because of the high degree of durability of the treated surface.

Preferably, the substrate is cleaned prior to applying the aqueous dilution of the present invention so as to obtain optimum characteristics, particularly durability. That is, the surface of the substrate to be coated preferably is substantially free of organic contamination prior to coating. Cleaning techniques depend on the type of substrate and include, for example, a solvent washing step with an organic solvent, such as acetone or ethanol, or exposure to a reactive gas-phase treatment such as air plasma or UV/ozone.

Useful substrates include, but are not limited to, textiles, apparel, leather, paper, cardboard, carpet, ceramics, glazed ceramics, porcelain, flat glass, hollow glass, metals (such as aluminum, iron, stainless steel, copper and the like), metal oxides, natural and man-made stone, thermoplastic materials (such as poly(meth)acrylate, polycarbonate, vinyl, polystyrene, styrene copolymers such as styrene/acrylonitrile copolymers, and polyesters such as polyethylene terephthalate), paints (such as those based on acrylic resins), powder coatings (such as polyurethane, epoxy or hybrid powder coatings), and wood.

Preferred substrates include metals and siliceous substrates including ceramics, glazed ceramics, glass, concrete, mortar, grout and natural and man-made stone. Particularly preferred substrates include glazed ceramics and glass. Various articles, having at least one substrate, can be effectively treated with the inventive aqueous dilution to provide a water and oil repellent coating thereon. Examples include glazed ceramic tiles, enameled bathtubs or toilets, glass shower panels, construction glass, various parts of a vehicle (such as the mirror or windscreen), and glazed ceramic or enamel pottery materials.

Another particularly preferred substrate is a substrate having an antireflective (AR) film on it. Antireflective (AR) films prepared by vacuum sputtering of metal oxide thin films on substrates made of glass or plastic are particularly useful in display devices of electronic equipment. Such metal oxide films are relatively porous and consist of clusters of particles forming a relatively rough profile. AR films help reduce glare and reflection. When the AR films are conductive, they also help reduce static discharge and electromagnetic emissions. Thus, a primary application for AR films is to provide contrast enhancement and antireflective properties to improve the readability of display devices, such as computer monitors. AR films are described in U.S. Pat. No. 5,851,674 (Pellerite et al.), which is incorporated herein by reference.

Sputtered metal oxide antireflective films are generally durable and uniform. Also, their optical properties are controllable, which makes them very desirable. They also have very high surface energies and refractive indices. However, the high surface energy of a sputtered metal oxide surface makes it prone to contamination by organic impurities (such as skin oils). The presence of surface contaminants results in a major degradation of antireflectivity properties of the metal oxide coatings. Furthermore, because of the high refractive indices, surface contamination becomes noticeable to the end-user. The present inventive method allows for a protective coating on an antireflective film that is relatively durable, and more resistant to contamination and easier to clean than the antireflective film by itself.

Preferably, the overall coating thickness of the dried coating ("dried down coating") of the aqueous dilution on an antireflective article is greater than a monolayer (which is typically greater than about 1.5 nanometers (nm) thick). That is, preferably, a coating from the aqueous dilution is at least about 2.0 nm thick for antisoiling purposes on articles having an AR film, and more preferably, at least about 3.0 nm thick. The coating from the aqueous dilution is typically present in an amount that does not substantially change the antireflective characteristics of the antireflective article.

Methods for applying the aqueous dilution to a substrate include, but are not limited to, spray, spin, dip, flow, and roll coat methods, etc. A preferred coating method for application of the aqueous dilution includes spray application. Spraying may be effected by passing the pressurized aqueous dilution though a suitable jet, nozzle or orifice onto the substrate surface in the form of a stream or atomized mist.

A substrate to be coated can typically be contacted with the aqueous dilution at room temperature (typically about 20° C. to about 25° C.). Alternatively, the aqueous dilution can be applied to a substrate that is preheated at a temperature of, for example, between 60° C. and 150° C. This is of particular interest for industrial production, where e.g., ceramic tiles can be treated immediately after the firing oven at the end of the production line. Following application, the treated substrate can be dried and cured at ambient or elevated temperature for a time sufficient to dry or cure.

The obtained coating on the substrate may be cured by UV radiation or thermally. For UV cure, curing additives may be added (such as those optional additives described above). Thermal curing is performed at an elevated temperature of about 40 to about 300° C., although elevated temperatures may not be required. The heat for curing can be supplied either through an initial preheat of substrates having sufficient heat capacity to provide the heat for curing, or through heating of coated substrates by an external heat source subsequent to coating.

Article

Another embodiment of the present invention is an article comprising: (a) a substrate (as described above); and, (b) a coating on said substrate obtained by applying the aqueous dilution (described above) onto said substrate and curing said aqueous dilution.

EXAMPLES

The invention is further illustrated by the following Examples, but the particular materials and amounts thereof recited in these Examples, as well as other conditions and details, should not be construed to unduly limit this invention.

GLOSSARY

| Descriptor | Name, Structure and/or Formula | Available from |
|---|---|---|
| AIBN | $(CH_3)_2C(CN)N=NC(CH_3)_2CN$ | Sigma-Aldrich |
| "ARQUAD 2C-75" | Quaternary ammonium surfactant | Akzo Nobel Chem., Netherlands |
| A-160 | $HS(CH_2)_3Si(OCH_3)_3$ | Sigma-Aldrich |
| ME | 2-mercaptoethanol; $HSCH_2CH_2OH$ | Sigma-Aldrich |
| ODMA | Octadecylmethacrylate; $H_2C=C(CH_3)C(O)O(CH_2)_{17}CH_3$ | Sartomer, Exton, PA |
| TMPMA | 3-(trimethoxysilyl)propyl methacrylate; $H_2C=C(CH_3)C(O)O(CH_2)_3Si(OCH_3)_3$ | Sigma-Aldrich |
| "TRITON X-405" | ethoxylated octylphenol | Union Carbide, Danbury, CT |
| $OCN(CH_2)_3Si(OCH_2CH_3)_3$ | 3-(triethoxysilyl) propylisocyanate | Sigma-Aldrich |

MeFBSEA, $C_4F_9SO_2N(CH_3)CH_2CH_2OC(O)CH=CH_2$, can be prepared as described in WO 01/30873 A1, Example 2, Part A & B.

FCS-1; $C_4F_9SO_2N(CH_3)(CH_2CH_2O)_{7.5}CH_3$, can be prepared as described in WO 01/30873 A1, Example 1 Part A & B.

FCS-2; Can be prepared as described in WO 01/30873 A1, Example 16.

$C_4F_9SO_2N(CH_3)H$ can be prepared as described in WO 01/30873 A1, Example 1, Part A Contact Angle Measurement The treated substrates were tested for their contact angles versus water (W) and n-hexadecane (O) using an Olympus TGHM goniometer (Olympus Corp, Pompano Beach Fl).

The contact angles were measured before (initial) and after abrasion (abrasion), unless otherwise indicated. Contact angles with water and hexadecane were measured at least 24 hrs after application or after abrasion. The values are the mean values of 4 measurements and are reported in degrees. The minimum measurable value for a contact angle was 20. A value<20 means that the liquid spreads on the surface.

Abrasion/Scrub Method

Abrasion testing was accomplished using an Erichsen cleaning machine (available from DCI, Belgium), 3M™ HIGH PERFORMANCE™ Cloth (available from 3M Co., St. Paul, Minn.) and CIF™ cream cleaner (available from Lever Faberge, France), using 40 cycles.

Preparation 1: MeFBSEA/A-160=4/1

A 500 mL three-necked round bottom flask, fitted with a condenser, stirrer and thermometer, was charged with MeFBSEA (41.1 g; 0.1 moles), A-160 (4.9 g 0.025 moles), ethylacetate (46.0 g), and AIBN (0.1 g). The mixture was degassed three times using aspirator vacuum and refilling with nitrogen. The mixture was reacted under nitrogen at 75° C. during 8 hours. Additional AIBN (0.05 g) was added and the reaction was continued for another 3 hrs at 75° C. Another aliquot of AIBN (0.05 g) was added and the reaction continued at 82° C. for 2 hrs. A clear solution of the oligomeric fluorochemical silane MeFBSEA/A-160=4/1 was obtained.

Preparation 2: MeFBSEA/ODMA/TMPMA/A-160=6/1/1/1

The preparation of MeFBSEA/ODMA/TMPMA/A-160=6/1/1/1 was performed by following the procedure described for Preparation 1 with the exception that the flask was charged with MeFBSEA (61.6 g; 0.15 mole), ODMA (8.5 g; 0.025 mole) TMPMA (6.2 g; 0.025 mole), A-160 (4.9 g; 0.025 mole), and AIBN (0.1 g).

Preparation 3: (MeFBSEA)$_4$SCH$_2$CH$_{10}$H and reaction product with OCN(CH$_2$)$_3$Si(OCH$_9$CH$_3$)$_3$ Fluorochemical silane (MeFBSEA)$_4$SCH$_2$CH$_2$OH and reaction product with OCN(CH$_1$)$_3$Si(OCH$_1$CH$_3$)$_3$ was prepared following a two-step reaction. In a first step, a fluorochemical oligomer, (MeFBSEA)$_4$SCH$_2$CH$_{10}$H, was made according to the following procedure:

A 3 l reaction flask, equipped with 2 reflux condensers, a mechanical teflon blade stirrer, a thermometer, a nitrogen inlet and vacuo outlet, was charged with MeFBSEA (2.4 moles) and ethylacetate (987 g). The mixture was heated to 40° C. until all material was dissolved. HSCH$_2$CH$_2$OH (0.6 moles) and AIBN (0.15%) was added and the solution was heated to 80° C., while stirring at 160 rpm. The reaction was run under nitrogen atmosphere at 80° C. during 16 hours, after which more than 95% conversion was obtained.

In a second step, the resulting fluorochemical oligomer was reacted with an equimolar amount of OCN(CH$_2$)$_3$Si(OCH$_2$CH$_3$)$_3$ according to the following method:

A 500 mL three necked round bottom flask, fitted with a condenser, stirrer and thermometer, was charged with MeFBSEA/HSCH$_2$CH$_2$OH (0.02 mole of a 60% solution of fluorochemical oligomer) as prepared above, ethylacetate (22 g), OCN(CH$_2$)$_3$Si(OCH$_2$CH$_3$)$_3$ (5 g) and 2 drops stannous octoate catalyst, under nitrogen atmosphere. The mixture was heated up to 75° C. under nitrogen and reacted during 16 hours. No residual isocyanate could be detected by infrared analysis. A clear solution resulted.

Preparation 4: MeFBSEA/TMPMA/A-160=4/1/1

The preparation of MeFBSEA/TMPMA/A-160 @ 4/1/1 was performed by following the procedure described for Preparation 1 with the exception that the flask was additionally charged with TMPMA (6.2 g; 0.025 mole).

Preparation 5: C$_4$F$_9$SO$_7$N(CH$_3$)(CH$_1$)$_3$Si(OCH$_1$)$_3$

Fluorochemical compound C$_4$F$_9$SO$_2$N(CH$_3$)(CH$_2$)$_3$Si(OCH$_3$)$_3$, used in Comparative Example C-2 was made according to the following procedure A 500 mL 3 necked reaction flask, fitted with a condenser, a stirrer, nitrogen inlet and thermometer, was charged with 0.1 moles C$_4$F$_9$SO$_2$N(CH$_3$)H (0.1 mole) and 30 g dry dimethylformamide (30 g). NaOCH$_3$ (0.1 mole; 30% solution in methanol) was added and the reaction mixture was heated for 1 hour at 50° C., under nitrogen. Methanol was removed under aspirator vacuum while keeping the temperature at 50° C. The reaction was cooled to 25° C., after which Cl(CH$_2$)$_3$Si(OCH$_3$)$_3$ (0.1 mole) was added. The reaction mixture was heated under nitrogen at 90° C. for 16 hours. The NaCl that formed during the reaction was filtered off. The completion of the reaction was followed by GLC. A clear yellow-brown solution resulted. DMF was removed by vacuum distillation and the fluorochemical reaction product was distilled at 120-150° C. (at about 0.4 mm Hg), resulting in a slightly yellow liquid.

Example 1

A 150 mL glass bottle was charged with Preparation 2 (60.0 g; containing about 50% fluorochemical solids) and FCS-2 (20.0 g; 50% solution of a fluorochemical oligomeric surfactant in ethylacetate). After 2 minutes of gentle stirring, a clear solution, containing 50% fluorochemical solids, resulted. Of this mixture, 2 grams were diluted in 97 gram of DI-water and 1 g HCl 37% was added. This water based dilution was then sprayed on hot (temperature about 120° C.) white, glazed wall tiles available from Villeroy & Boch, Germany. Excess coating was removed after about 10 minutes using a soft wipe. Contact angles were measured according to the above procedure before and after abrasion. The results are summarized in Table 1.

Examples 2 to 8 and Comparative Examples C1 and C2

Examples 2 to 8 and comparatives C1 and C2, were prepared according to the procedure of example 1, using the ingredients and amounts as listed in table 1. Product application and testing was done according to example 1. The results are summarized in Table 1.

TABLE 1

| | | Contact Angle Water/ Hexadecane (°) | |
|---|---|---|---|
| Example | Composition | Initial | post-abrasion |
| 1 | Preparation 2 (60.0 g) and FCS-2 (20.0 g) | 95/65 | 70/50 |
| 2 | Preparation 2 (60.0 g) and FCS-1 (10.0 g) | 95/63 | 65/47 |

TABLE 1-continued

| Example | Composition | Contact Angle Water/Hexadecane (°) | |
|---|---|---|---|
| | | Initial | post-abrasion |
| 3 | Preparation 2 (60.0 g) and "ARQUAD 2C-75" (20.0 g) | 92/60 | 60/42 |
| 4 | Preparation 2 (60.0 g) and "TRITON X-405" (10.0 g) | 95/68 | 68/46 |
| 5 | Preparation 1 (60.0 g) and FCS-2 (20.0 g) | 98/62 | 64/46 |
| 6 | Preparation 4 (60.0 g) and FCS-2 (20.0 g) | 108/68 | 77/52 |
| 7 | Preparation 3 (60.0 g) and FCS-2 (20.0 g) | 102/67 | 68/44 |
| 8 | Preparation 2 (60.0 g) and FCS-2 (15.0 g) and "ARQUAD 2C-75" (15.0 g) | 96/61 | 60/40 |
| C-1 | See U.S. Pat. No. 5,550,184 Preparation 8 using "TRITON X-405" | 94/58 | 45/30 |
| C-2 | $C_4F_9SO_2N(CH_3)(CH_2)_3Si(OCH_3)_3$ (30.0 g) and FCS-2 (20.0 g) and ethanol (30.0 g) | 90/57 | 49/32 |

Values for post-abrasion contact angles of Examples of the invention are significantly higher than values for Comparative Examples. This indicates improved abrasion resistance of the coatings of the Examples.

We claim:

1. A dilutable, non-aqueous concentrate comprising a mixture of:
(a) at least one fluorinated oligomeric silane of the formula:

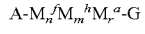
$$A\text{-}M_n^f M_m^h M_r^a\text{-}G$$

wherein
A is hydrogen or a residue of an initiating species;
$M^f$ represents units derived from one or more fluorinated monomers;
$M^h$ represents units derived from one or more non-fluorinated monomers;
$M^a$ represents units derived from one or more non-fluorinated monomers having a silyl group, $SiY_3$ where Y is a hydrolyzable group selected from the group consisting of —Cl, —OCH$_3$, and —OC$_2$H$_5$; and
G is a residue of a chain transfer agent of the formula

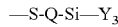
$$-\text{S-Q-Si}-Y_3$$

in which Y is a hydrolyzable group selected from the group consisting of —Cl, —OCH$_3$, and —OC$_2$H$_5$, and Q is an organic divalent linking group; n is an integer from 1 to 100; m is an integer from 0 to 100; and r is an integer from 0 to 100; and
(b) at least one fluorocarbon surfactant.

2. The concentrate of claim 1, wherein the fluorinated monomer is of the formula

$$R_f\text{-Q-E}$$

wherein $R_f$ is a $C_2$-$C_8$ perfluoroalkyl group;
Q is an organic divalent linking group; and
E is an ethylenically unsaturated group.

3. The concentrate of claim 2, wherein $R_f$ is a $C_3$-$C_5$ perfluoroalkyl group.

4. The concentrate of claim 2, wherein $R_f$ is a $C_4$ perfluoroalkyl group.

5. The concentrate of claim 1 comprising:
(a) at least one fluorinated oligomeric silane of the formula

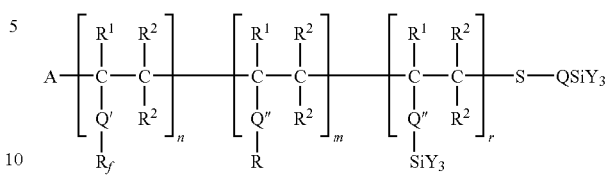

wherein
$R_f$ is a $C_2$-$C_8$ perfluoroalkyl group;
R is a hydrocarbon group of from 4 to 30 carbon atoms which may be substituted by one or more reactive groups;
$R_1$ and $R_2$ are independently hydrogen or a $C_1$-$C_4$ alkyl group;
Q is —(CH$_2$)—$_d$;
Q' is a linking group of the formula —SO$_2$N(R$_1$)(CH$_2$)$_d$—OC(O)—;
Q" is a linking group of the formula —(CH$_2$)$_d$—OC(O)— or a chemical bond;
n is an integer from 1 to 20;
m and r are integers from 0 to 20; and
d is an integer from 1 to 20.

6. An aqueous composition comprising:
(a) a diluting medium comprising water or an aqueous solvent mixture comprising water and at least one water miscible cosolvent; and
(b) a dilutable, non-aqueous concentrate according to claim 5.

7. The concentrate of claim 1, which further comprises one or both of at least one organic cosolvent and at least one additive.

8. The concentrate of claim 7, wherein the cosolvent is an alcohol, a ketone, an ether, N-methylpyrrolidinone, N,N-dimethylformamide, or a mixture thereof.

9. The concentrate of claim 1, wherein at least one fluorocarbon surfactant comprises:

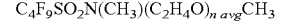
$$C_4F_9SO_2N(CH_3)(C_2H_4O)_{n\,avg}CH_3$$

in which $n_{avg}$ is about 7.

10. The concentrate of claim 1, wherein said at least one fluorocarbon surfactant comprises:

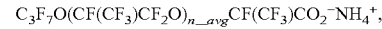
$$C_3F_7O(CF(CF_3)CF_2O)_{n\_avg}CF(CF_3)CO_2^-NH_4^+,$$

in which $n_{avg}$ is about 13.

11. The concentrate of claim 1, wherein said at least one fluorocarbon surfactant is a polymeric surfactant.

12. The concentrate of claim 1, wherein said at least one fluorocarbon surfactant is a random copolymer surfactant.

13. The concentrate of claim 12, wherein said random copolymer surfactant comprises:

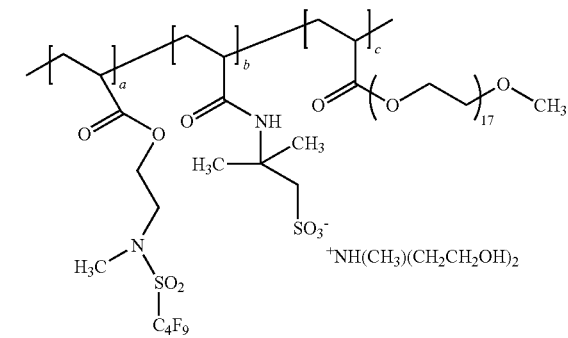

wherein the molar ratio of a:b:c is about 30:about 1:about 32, and wherein the random copolymer fluorinated surfactant has a molecular weight of about 1,000 to about 4,000 grams per mole.

14. The concentrate of claim 12, wherein said random copolymer surfactant comprises:

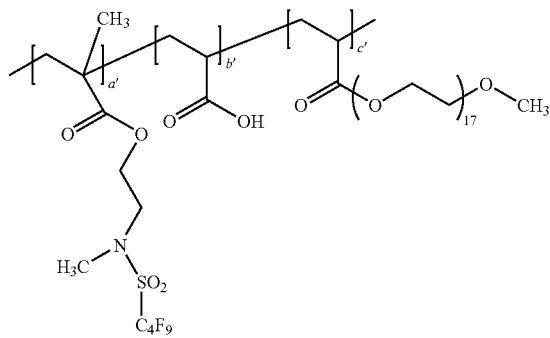

wherein the molar ratio of a':b':c' is about 3:about 3:about 1, and wherein the random copolymer fluorinated surfactant has a molecular weight of about 5,000 to 40,000 grams per mole.

15. An aqueous composition comprising:
(a) a diluting medium comprising water or an aqueous solvent mixture comprising water and at least one water miscible cosolvent; and
(b) a dilutable, non-aqueous concentrate according to claim 1.

16. A method of treating a substrate comprising the steps of applying an aqueous composition according to claim 15 to said substrate, and curing said aqueous composition.

17. An article comprising:
(a) a substrate; and
(b) a coating on said substrate obtained according to the method of claim 16.

18. The article of claim 17, wherein the substrate comprises glass, ceramic, or an antireflective film.

19. The concentrate of claim 1, wherein the concentrate comprises the at least one organic cosolvent in an amount less than 50 percent by weight, based on the weight of the concentrate.

20. The concentrate of claim 1, wherein the concentrate comprises the fluorinated surfactant in an amount up to 50 percent by weight, based on the weight of the concentrate.

* * * * *